Nov. 25, 1924.

1,516,678

G. MORRISON

REMOVING SKINS FROM PORK BELLIES

Filed June 28, 1924     2 Sheets-Sheet 1

Witness
Martin H. Olsen.

Inventor
George Morrison
By Rummler & Rummler
Attys.

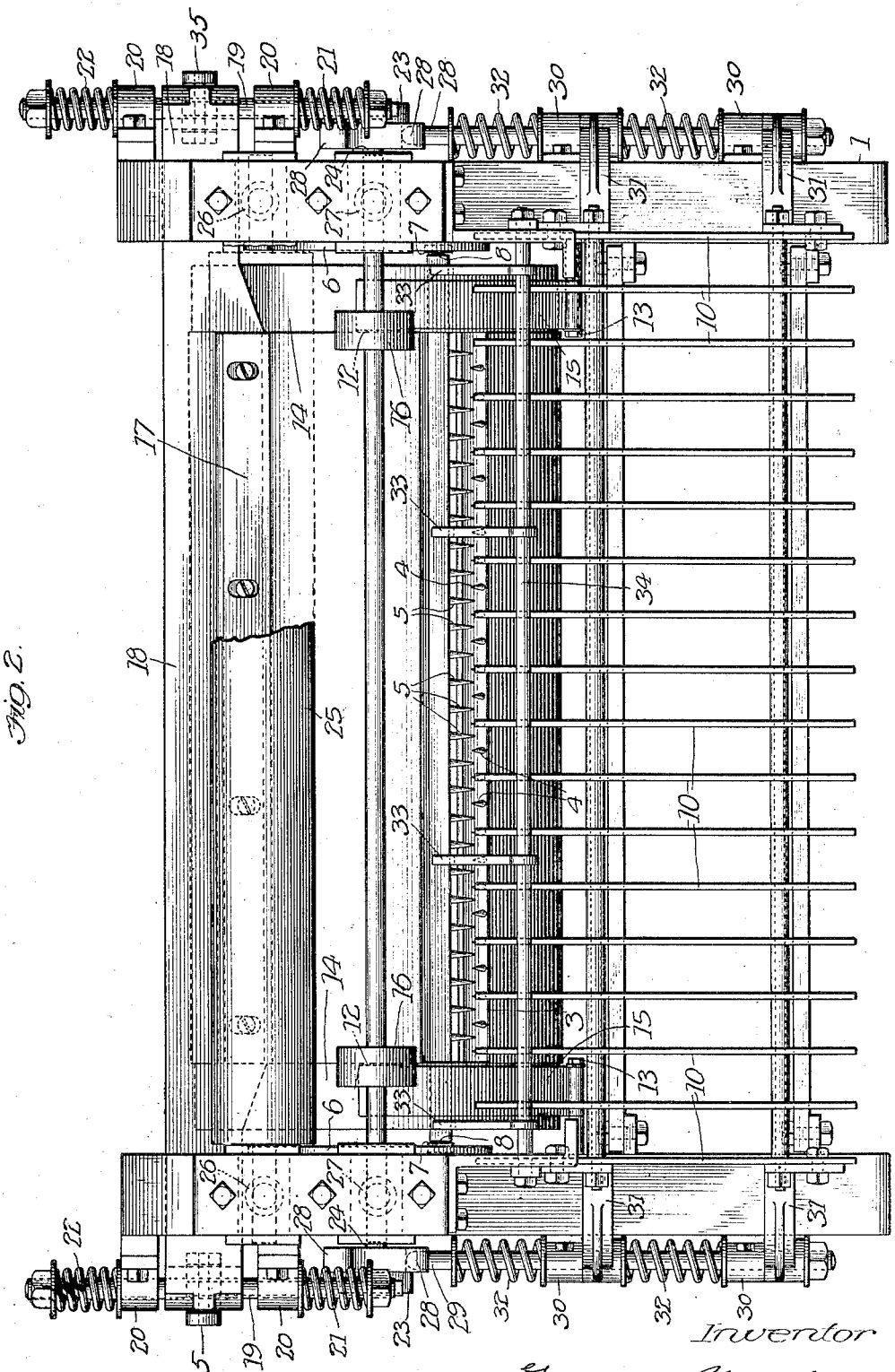

Patented Nov. 25, 1924.

1,516,678

UNITED STATES PATENT OFFICE.

GEORGE MORRISON, OF DENVER, COLORADO, ASSIGNOR TO SWIFT & COMPANY, OF CHICAGO, ILLINOIS, A CORPORATION OF ILLINOIS.

REMOVING SKINS FROM PORK BELLIES.

Application filed June 28, 1924. Serial No. 722,968.

*To all whom it may concern:*

Be it known that I, GEORGE MORRISON, a citizen of the United States of America, and a resident of Denver, county of Denver, and State of Colorado, have invented a new and useful Improvement in Removing Skins from Pork Bellies, of which the following is a specification.

This invention relates to a method for removing the skins from pork bellies, and the purpose of the invention is to do more perfect work and with less waste than is ordinarily the case when the usual method is followed by severing the skin from the bacon by means of a lengthwise motion of the pork belly with relation to the knife.

The present method utilizes a crosswise relative motion between the pork belly and the skin removing knife in order that the belly may be drawn against the action of the knife in order to straighten out the wrinkles which extend longitudinally of the skin. During this operation the knife is caused to follow the surface of the skin to compensate for variations in its thickness. The skin is thickest along the edge of the bacon following the line of the back bone of the animal, and the machine for removing the skin is provided with gripping teeth for engaging this part of the skin and then drawing the belly sidewise against the knife. This knife enters the material operated upon at the thick end of the skin, following its surface as the belly is drawn through the machine. At the same time a brisket knife at one side of the machine removes the uneven part of the fat and skin at one side of the slab of bacon. This machine is used for producing the choicest cuts of bacon, which are packaged in rectangular form. Therefore, while the bacon must be delivered in rectangular form, it is also necessary to reduce the waste of fat to a minimum and also deliver the skins with the fat substantially all removed therefrom and uninjured by the knife.

The invention is made effective by the use of preferably a continuously rotating drum, which has one or more longitudinal recesses in which the gripping devices are located in order that the surface of the drum may be flush and not interfere with the proper operation of the skin removing knife. This knife is substantially stationary with respect to the drum, except for a slight movement toward and away from the drum for the purpose of compensating for the variation in thickness of the skin. A grating or table having a slight reciprocating motion receives the pork belly and carries it toward the drum in proper time to have the gripping fingers or prongs carried by the drum penetrate the fat at the edge of the skin and grip it as required for successful operation of the machine.

In the construction as illustrated in the drawings,—

Figure 2 is a plan view of the machine.

Figure 1:
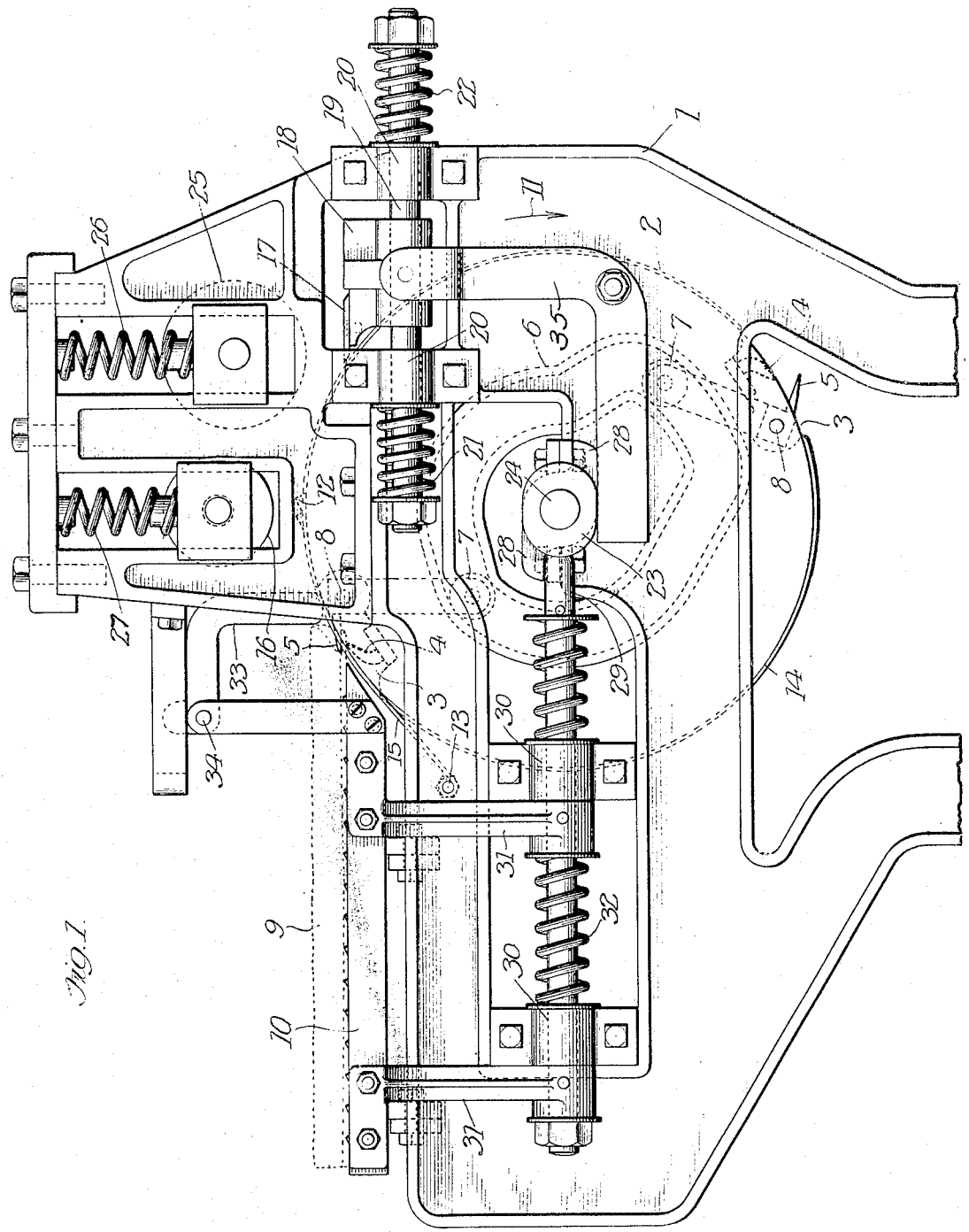
Figure 1 is a side view of the machine with the bottom part of its supporting frame broken away, and the pulley or other means for rotating the drum and operating the table and knives omitted.

These drawings show a supporting frame 1, within which is journaled a roller or drum 2, driven at the desired speed for the cutting operation by any suitable means. This drum has a pair of longitudinal grooves 3 at opposite sides, and within which are mounted a set of fixed prongs 4 and rocking prongs 5. The latter are operated at the proper times for gripping and releasing the entering edge of the skin of pork cuts passing through the machine. The means for operating the set of prongs 5 are a pair of stationary box cams 6, located at the sides of the machine and engaging rollers 7 on arms rigid with the set of prongs 5, which are pivotally supported on the roller 2 at 8.

The pork cuts 9 are placed upon a reciprocating table or grating 10, which is given a movement toward the drum 2 when one of the sets of gripping devices 4 and 5 arrive opposite the table. The prongs 5 enter the belly very close to the skin, and then are rocked downwardly, pinching the edge of the skin between the prongs 4 and 5. The pork cut is then carried along with the drum, which rotates in the direction indicated by arrow 11. The side or brisket portion is trimmed from the remainder of the pork cut by brisket knives 12, attached to the machine frame at 13 and located at the edge of the reduced portion 14 of the drum. These knives are carried by resilient elements 15, and coact with rollers 16. One such knife is located at each side of the machine in convenient position for both the right and left cuts of pork.

Further rotation of drum 2 results in the knife 17 severing the skin from the belly. Knife 17 extends longitudinally of the drum and is supported by a cross frame 18 rigid with a longitudinally extending shaft 19 at each side of the frame. The shafts 19 pass through bearings 20 within which these shafts may reciprocate slightly against the action of springs 21 and 22. The knife is, therefore, resiliently mounted, which is essential to economical skinning of pork bellies with the drum type of machine. The knife is moved toward the drum during the operation in order to compensate for the reducing thickness of the skin of the pork cut, and accordingly closely follows the inner surface of the skin. The means for causing this movement of the knife are the bell cranks 35, and cams 23 rigid with supporting trunnions 24 of roller 2. A resiliently mounted roller 25 extends parallel with drum 2 above the knife 7. This roller is pressed toward the knife 17 by springs 26, either against limit stops or opposed springs. The rollers 16 are likewise resiliently urged toward the knives 12 by springs 27. The table 10 is reciprocated in time with the operation of drum 2 by means of cams 28, fast to trunnions 24. These cams engage the ends of reciprocating supporting shafts 29, slidable in the bearings 30, and carrying fast thereto supporting brackets 31 for the table 10. The forward motion of table 10 toward drum 2 is effected by the coil springs 32, and the return motion by the cams 28. The table 10 carries an overhanging gage 33 to facilitate the correct placing of the pork cuts on the table. This gage is pivotally mounted at 34, and rocks out of the way as the pork cuts are drawn around the drum.

In the operation of the device, the belly is fed into the machine with the brisket end flush with the end of the drum. The reciprocating table carries the belly forward at the proper time to cause the prongs 5 to enter above the skin at the back of the cut. By a slight rocking motion imparted to prongs 5, the edge of the skin is firmly gripped between these prongs and the set of prongs 4, the gripping device then remaining below the surface of the drum until it releases the skin. As the pork belly is drawn from table 10, the brisket knives cut the skin on a line between the brisket and belly. The brisket is then guided over the skinning knife 17 with the belly, but the skin removed from the belly is carried downwardly with the drum until the roller 7 of the gripping devices arrives at the releasing portion of cam 6. During the skinning operation the skin is stretched against the reactance of the skinning knife 17. The wrinkles in the skin run longitudinally thereof parallel with the axis of the drum when the cut is properly placed upon the machine, and the skin is straightened out by the stretching action during the skinning operation. All pork belly skins are thicker on the back side than on the flank or belly side. The cut is started at the back side, and then the edge of the skinning knife approaches closer to the drum as the belly or flang portion of the skin approaches the knife. This action is very successively accomplished by the spring and cam action of the machine.

Although but one specific embodiment of this invention has been herein shown and described, it will be understood that numerous details of the construction shown may be altered or omitted without departing from the spirit of this invention as defined by the following claims.

I claim:

1. The method of removing skins from pork bellies, consisting in gripping the thick edge of the skin and drawing the belly sidewise and to cause a knife to enter the belly at the thick edge of the skin, and then producing a relative motion between the knife and the belly in order to straighten out wrinkles in the skin and remove the bacon therefrom.

2. The method of removing skins from pork bellies, consisting in gripping the thick edge of the skin and drawing the belly sidewise and to cause a knife to enter the belly at the thick edge of the skin, and then producing a relative motion between the knife and the belly in order to straighten out wrinkles in the skin and remove the bacon therefrom and at the same time causing the knife to closely follow the skin in order to compensate for variations in thickness of the skin.

3. A pork belly skinning machine comprising a roller having a longitudinal groove therein, two sets of gripping prongs located in said groove, a reciprocating table arranged at one side of said roller and timed therewith to cause the skin at the edge of a pork belly placed thereon to come between said prongs during the rotation of the roller, means for automatically rocking one set of said gripping prongs toward and away from the other set, a knife located at one side of said drum in position to enter the belly at the inner side of the skin and follow the surface of the skin during the rotation of the roller, and means for reciprocating said table.

4. A pork belly skinning machine comprising a roller having a longitudinal groove therein, two sets of gripping prongs located in said groove, a reciprocating table arranged at one side of said roller and timed therewith to cause the skin at the edge of a pork belly placed thereon to come between said prongs during the rotation of the roller, means for automatically rocking one set of said gripping prongs toward and away from the other set, a knife located at one side of said drum in position to enter the belly at the inner side of the skin and follow the surface of the skin during the rotation of the roller, means for reciprocating said table, and means for causing said knife to approach and recede from the roller in order to compensate for variations in thickness of skins.

5. A pork belly skinning machine comprising a roller having a longitudinal groove therein, two sets of gripping prongs located in said groove, means for automatically rocking one set of said gripping prongs toward and away from the other set, a knife located at one side of said drum in position to enter the belly at the inner side of the skin and follow the surface of the skin during the rotation of the roller, a reciprocating table arranged at one side of said roller and timed therewith to cause the skin at the edge of a pork belly placed thereon to come between said prongs during the rotation of the roller and means for reciprocating said table.

Signed at Denver this 20th day of June, 1924.

GEORGE MORRISON.